US 10,123,311 B1

(12) United States Patent
Srinivas et al.

(10) Patent No.: US 10,123,311 B1
(45) Date of Patent: Nov. 6, 2018

(54) DIFFERENTIAL CONTROL OF TTI BUNDLING BASED ON UE MAXIMUM TRANSMIT POWER

(71) Applicant: Sprint Spectrum L.P., Overland Park, KS (US)

(72) Inventors: Shilpa K. Srinivas, Brambleton, VA (US); Siddharth S. Oroskar, Overland Park, KS (US); Hemanth B. Pawar, Brambleton, VA (US); Jasinder P. Singh, Olathe, KS (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 10 days.

(21) Appl. No.: 15/583,225

(22) Filed: May 1, 2017

(51) Int. Cl.
  *H04W 72/04* (2009.01)
  *H04W 52/36* (2009.01)
  *H04L 25/02* (2006.01)
  *H04W 72/08* (2009.01)

(52) U.S. Cl.
  CPC ..... *H04W 72/0413* (2013.01); *H04L 25/0228* (2013.01); *H04W 52/367* (2013.01); *H04W 72/048* (2013.01); *H04W 72/0486* (2013.01); *H04W 72/085* (2013.01)

(58) Field of Classification Search
  None
  See application file for complete search history.

(56) References Cited

U.S. PATENT DOCUMENTS

| | | | |
|---|---|---|---|
| 8,982,755 B1* | 3/2015 | Shah | H04L 1/18 370/311 |
| 9,215,724 B2 | 12/2015 | Eriksson et al. | |
| 9,357,546 B1 | 5/2016 | Marupaduga et al. | |
| 9,986,556 B1* | 5/2018 | Zhou | H04W 72/0446 |
| 2016/0007348 A1 | 1/2016 | Zhang et al. | |
| 2016/0128076 A1 | 5/2016 | Langereis et al. | |
| 2018/0049058 A1* | 2/2018 | Faronius | H04W 28/02 |

* cited by examiner

*Primary Examiner* — Anh Ngoc M Nguyen

(57) ABSTRACT

A method and system for controlling TTI bundling in a wireless communication system that includes a base station configured to serve UEs over an air interface, where each UE has a maximum transmit power for air interface transmission, where the UEs include a first class of UEs and a second class of UEs, and where the maximum transmit power of the UEs of the second class is higher than the maximum transmit power of the UEs of the first class. The base station detects a capacity constraint on the air interface, such a threshold high air interface load, and the base station responds by operating in a mode in which the base station differentially controls application of TTI bundling as between the first class of UEs and the second class of UEs, based on the second class of UEs having higher maximum transmit power than the first class of UEs.

20 Claims, 3 Drawing Sheets

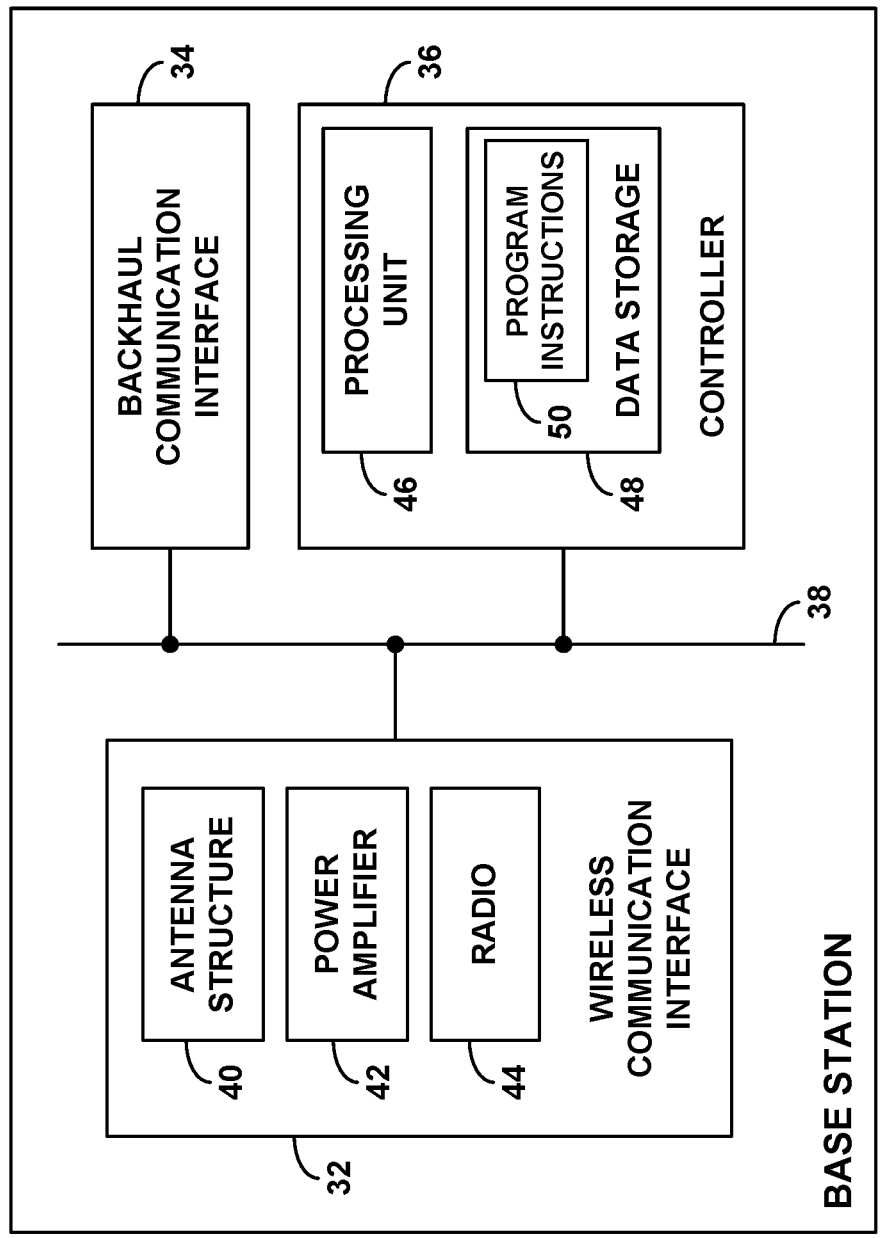

US 10,123,311 B1

DIFFERENTIAL CONTROL OF TTI BUNDLING BASED ON UE MAXIMUM TRANSMIT POWER

BACKGROUND

In some wireless communication systems, when data that is transmitted by a transmitting entity to a receiving entity is not received by the receiving entity, or is received by the receiving entity with one or more errors, the data may be re-transmitted by the transmitting entity. The re-transmission of data could occur either automatically or in response to feedback from the receiving entity. For example, in Long Term Evolution (LTE) air interfaces, a Hybrid Automatic Repeat Request (HARQ) procedure is used. In the HARQ approach, after a transmitting entity has transmitted a block of data, possibly together with error-correction coding, the transmitting entity waits to receive a HARQ response from the receiving entity. If the transmitting entity receives a positive acknowledgement (ACK) as the HARQ response, then no re-transmission is needed and the transmitting entity can transmit additional data. If the transmitting entity receives a negative acknowledgement (NACK) as the HARQ response, then the transmitting entity re-transmits the data, possibly with different error-correction coding. Further, the transmitting entity may also re-transmit the data if the transmitting entity does not receive any HARQ response within a certain period of time.

This re-transmission approach can allow data to be successfully decoded by a receiving entity even when there is a substantial probability that the transmitted data would be received with one or more errors, for example, because of poor radio frequency (RF) conditions. Specifically, the data can be re-transmitted multiple times, possibly with varying error-correction coding, until the receiving entity can decode the data without errors. This re-transmission approach, however, also increases latency. For example, there can be a period of delay between when the transmitting entity transmits data and when the transmitting data receives a NACK response from the receiving entity, and there can be another period of delay between when the transmitting entity receives the NACK response and when the transmitting entity begins re-transmitting the data.

In order to reduce the delay associated with re-transmitting data, LTE supports a bundling option for data transmissions by the user equipment (UE) in the Physical Uplink Shared Channel (PUSCH). Normally, the UE transmits data in one transmission time interval (TTI), which corresponds to a 1 millisecond (ms) subframe, and then waits to receive a HARQ response before re-transmitting the data or transmitting additional data. However, when TTI bundling is used, the UE automatically transmits the data repeatedly in multiple consecutive TTIs and then waits to receive a HARQ response for that group of transmissions. In this way, the UE can transmit multiple instances of the data, which allows for more robust reception of the data, but without the delay that would be associated with the UE transmitting the data multiple times and waiting for a HARQ response after each transmission.

OVERVIEW

While TTI bundling can thus advantageously help minimize latency, a tradeoff for that benefit is that TTI bundling necessarily consumes air interface resources in multiple TTIs. Namely, when TTI bundling is enabled for a UE, the UE automatically transmits data in each of multiple TTIs. As a result, air interface resources need to be reserved for the UE's use in each of those TTIs, even if transmission in fewer TTIs might result in successful decoding of the data. At times of light air interface load, this reservation of resources may not pose an issue. However, at times of heavy load, use of TTI bundling could contribute to problems such as reduced throughput and blocking of other communications. Consequently, when faced with heavy air interface load, it could be useful to limit the extent of TTI bundling.

As noted above, re-transmission as provided by TTI bundling could help address a situation where a UE is in poor RF conditions. For instance, TTI bundling could help address a situation where a UE is distant from its serving base station and/or is operating indoors or behind other obstructions.

Yet there are also other techniques to address poor RF conditions.

One such other technique is to increase the UE's transmit power, as transmission at increased power could similarly help to improve reception and decoding of the UE's transmission. Applying a representative power control process, for instance, a UE's serving base station could detect threshold weak received signal strength from the UE and could responsively send a power-up command to the UE, and the UE could then respond to that command by incrementing its transmit power. Further, this power control process could continue iteratively as necessary, until the UE's transmit power reaches a designated or configured maximum level.

By industry standard, UEs have traditionally been limited to operating with a maximum transmit power of 23 decibel-milliwatts (dBm) (about 0.2 Watts). Thus, when a traditional UE is faced with particular poor RF conditions, such as operating at a distance from its serving base station or operating indoors or behind other obstructions, the power control process could result in increasing the UE's transmit power up to 23 dBm, which could help improve decoding and reception of the UE's transmissions.

Further, recent developments have led to government approval for another class of UEs, designated "high performance UEs" or HPUEs, to operate with a higher maximum transmit power of 26 dBm (about 0.4 Watts) on certain carrier frequencies. Advantageously, when an HPUE is operating on such a carrier and is faced with the same poor RF conditions as noted above, the power control process could thus result in increasing the HPUE's transmit power as high as 26 dBm, which could more substantially help improve decoding and reception of the HPUE's transmissions.

Given the desire to more selectively apply TTI bundling when faced with high air interface load, and given that HPUEs have the potential to more substantially overcome RF conditions by operating at higher maximum transmit power than traditional UEs, it would be useful to differentially control TTI bundling based at least on UE power class. Namely, when faced with high air interface load, it would be useful (i) to limit TTI bundling to traditional UEs and thus avoid use of TTI bundling for HPUEs, (ii) to impose stricter conditions for invoking TTI bundling for HPUEs than for traditional UEs, and/or (iii) to apply a lesser extent of TTI bundling (e.g., smaller a TTI bundling size) for HPUEs than for traditional UEs. Further, it could be useful to apply such restrictions with respect to operation on particular carriers where HPUEs are allowed to operate with higher maximum transmit power than traditional UEs.

Accordingly, disclosed herein is a method for controlling TTI bundling in a wireless communication system that includes a base station configured to serve UEs over an air interface, where each UE has a maximum transmit power for transmitting on the air interface, where the UEs include a first class of UEs and a second class of UEs, and where the maximum transmit power of the UEs of the second class is higher than the maximum transmit power of the UEs of the first class. In accordance with the method, the base station detects a capacity constraint of the air interface, such a threshold high load on the air interface, and the base station responds by differentially controlling use of TTI bundling as between the first class of UEs and the second class of UEs, based on the second class of UEs having higher maximum transmit power than the first class of UEs. Further disclosed is a base station configured to control TTI bundling in this manner.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 3 is a simplified block diagram of an example base station operable in accordance with the disclosure.

DETAILED DESCRIPTION

The present method and apparatus will be described herein in the context of LTE as an example radio access protocol and associated network arrangement. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processing unit executing software instructions for instance.

Figure 1:
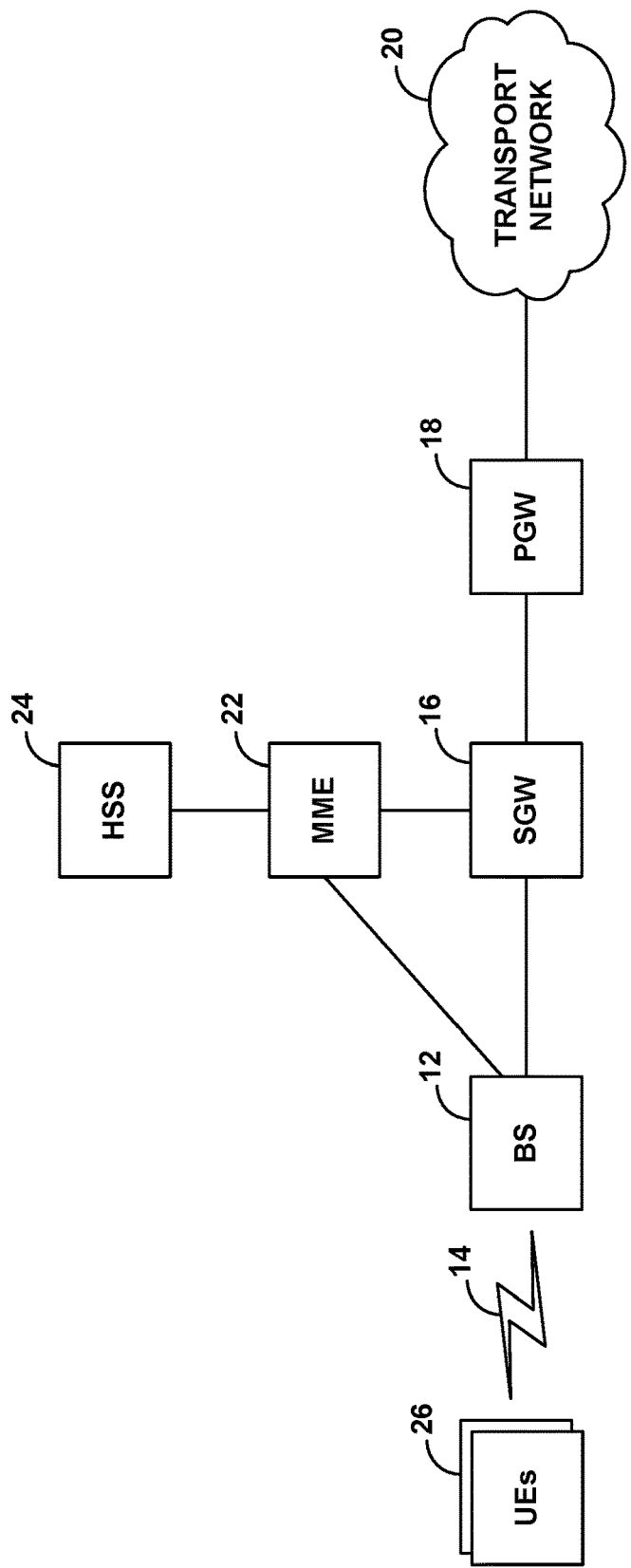
FIG. 1 is a simplified block diagram of a wireless communication system in which the present method and system can be implemented.

Referring to the drawings, as noted above, FIG. 1 is a simplified block diagram of a wireless communication system in which features of the present disclosure can be implemented. In particular, FIG. 1 depicts an example LTE network.

As shown, the example LTE network includes a representative LTE base station (evolved Node-B or "eNodeB") 12 (e.g., macro base station, small cell, relay, or other type of base station), configured to provide a wireless coverage area defining an air interface 14 for communicating with UEs. Base station 12 then has a communication interface with a serving gateway (SGW) 16, which in turn has a communication interface with a packet-data network gateway (PGW) 18, which provides connectivity with a transport network 20 such as the Internet. Further, base station 12 and SGW 16 have communication interfaces with a mobility management entity (MME) 22, which in turn has a communication interface with a home subscriber server (HSS) 24.

These components of the LTE network could sit as nodes on a core packet-switched network operated by an LTE service provider, and the interfaces between the components could be virtual tunnels defined within that core network.

In a representative LTE network, the air interface 14 operates on a carrier, defining one or more ranges of frequency on which communications can flow in a downlink direction from the base station to UEs and in an uplink direction from UEs to the base station. For instance, the carrier could be frequency division duplex (FDD), with separate frequency ranges defined respectively for downlink use and uplink use, or time division duplex (TDD), with a single frequency range being time division multiplexed between downlink and uplink use.

On such a carrier, the LTE air interface is divided over time into a continuum of 10-millisecond frames, each of which is then divided into ten 1-millisecond subframes or TTIs, and each TTI is then divided over time into 14 symbol time segments of 66.7 microseconds. Further, the carrier has a frequency bandwidth (e.g., respectively for its downlink and uplink, if TDD), such as 1.4 MHz, 3 MHz, 5 MHz, 10 MHz, 15 MHz, or 20 MHz, which is divided into subcarriers of 15 kHz. As a result, in each TTI, the LTE air interface defines an array of "resource elements" each occupying a 15 kHz subcarrier and spanning 66.7 microseconds, and the subcarriers of these resource elements can be modulated to represent data for communication over the air interface between the base station and one or more UEs.

LTE then reserves certain ones of these resource elements for particular use.

For instance, on the downlink, the resource elements in the first one to three symbol time segments per subframe are generally reserved to define a control channels, including a Physical Downlink Control Channel (PDSCH) and a Physical HARQ Channel (PHICH). And the resource elements in the remaining symbol time segments per subframe are generally reserved define a Physical Downlink Shared Channel (PDSCH), with resource elements being grouped into physical resource blocks (PRBs) that the base station can allocate as needed to carry data from the base station to particular UEs. Further, downlink certain resource elements are reserved for other purposes. For instance, certain resource elements throughout the carrier bandwidth are reserved to carry a reference signal that UEs can measure as a basis to evaluate coverage quality.

And on the uplink, groups of resource elements at the low-frequency end of the carrier and at the high-frequency end of the carrier are generally reserved to define a Physical Uplink Control Channel (PUCCH). And the remaining resource elements per uplink subframe are generally reserved to define a Physical Uplink Shared Channel (PUSCH, as noted above), with resource elements similarly being grouped into PRBs that the base station can allocate as needed to carry data from particular UEs to the base station.

FIG. 1 depicts multiple UEs 26 within coverage of the base station 12. Each of these UEs could take any of various forms (such as a mobile phone, a computer, a tracking device, an embedded wireless module, or other wirelessly equipped device, whether or not user operated), and could be positioned at various locations within coverage of the base station. Some UEs could be in good coverage, such as being close to the base station and without significant RF obstructions, and other UEs could be in poor coverage, such as being far from the base station and/or indoors or otherwise faced with RF obstructions.

When a UE initially enters into coverage of the LTE network, the UE could discover coverage of base station 12 and could then engage in a process to register for service. For instance, the UE could engage in random access signaling and Radio Resource Control (RRC) signaling with the base station to establish an RRC connection for the UE. Further, the UE could engage in an attach process, through which the MME 22 could authenticate the UE and coordinate setup of one or more bearer tunnels for carrying communications between the UE and the PGW 18 (and thus between the UE and the transport network 20).

In addition, as part of the attach process or separately, the base station could receive UE profile data, indicating service authorizations, capabilities, and other information regarding the UE. The UE could transmit some such data to the base station as a UE-capability report or the like. Further, the MME could obtain some such data from the HSS and could transmit the data to the base station. The base station could then store the received profile data in a UE context record associated with the UE's RRC connection, for reference while serving the UE.

Once a UE is attached with the network and served by the base station, the base station could then coordinate air interface communication with the UE as necessary.

Considering uplink communication, for instance, when the UE has data to transmit on transport network 20, the UE could send a scheduling request to the base station via the PUCCH. And in response, the base station could then select PRBs of an upcoming subframe to carry the requested communication and could transmit to the UE on the PDCCH of a subframe an advanced scheduling directive, such as a downlink control information (DCI) message, to cause the UE to engage in the transmission in the selected PRBs of the upcoming subframe. At the designated time, the UE could thus transmit the data to the base station in the designated PRBs.

Further, the base station and UE could apply a HARQ process as discussed above. Namely, when the base station has scheduled uplink communication from the UE to occur in a particular subframe, the base station could then determine if the base station successfully receives and decodes that transmission. And the base station could transmit a HARQ message to the UE in the PHICH of a subsequent subframe (e.g., four subframes later if the carrier is FDD, or the next downlink subframe that is at least four subframes later if the carrier is TDD). If the base station successfully receives and decodes the UE's transmission, then the base station could transmit an ACK to the UE, after which the UE may then proceed with transmission of other data to the base station. Whereas, if the base station does not successfully receive and/or decode the UE's transmission, then the base station could transmit a NACK to the UE, in response to which the UE could then engage in a re-transmission, possibly with different error correction coding, in a subsequent uplink subframe (again possibly depending on FDD or TDD configuration).

As further noted above, the base station and UE could also make use of TTI bundling to help improve the chances of the base station successfully receiving and decoding the UE's transmissions. With TTI bundling, the UE could automatically engage in repeat transmission of data in multiple subframes (TTIs), possibly with varying error correction coding per transmission, and the base station could then provide a HARQ message for the bundle of those transmissions. For instance, with a bundling size of four subframes, the UE could automatically transmit the data at issue in each of four consecutive subframes (four sequentially occurring uplink subframes if the carrier is TDD), with varying error correction coding per subframe, and the base station could then determine whether the base station successfully received and decoded the data at issue and could provide an ACK or NACK message accordingly in a subsequent downlink subframe.

To apply TTI bundling, the base station could provide a TTI-bundling directive together with the scheduling directive that the base station sends to the UE to schedule the uplink transmission. For instance, if the base station provides a DCI to the UE to schedule uplink communication by the UE, the base station could designate in the DCI which PRBs the UE is to use and could designate a TTI bundling size representing how many upcoming uplink subframes in a row the UE should engage in the uplink transmission on those PRBs, or the base station could otherwise specify that TTI bundling is to be applied and, if not implicit, could designate the bundling size defining how many times to engage in the transmission. Upon receipt of such a directive, the UE could then responsively engage in transmission accordingly, using resources in each of the multiple subframes. And after those multiple transmissions, the base station could then provide the UE with a HARQ message indicating whether or not the base station successfully received and decoded the data at issue, and processing could continue as noted above.

The base station could be configured to trigger use of TTI bundling for a UE when the UE is in poor RF coverage. For instance, the UE could regularly monitor the reference signal from the base station and, when the reference signal becomes threshold weak, could transmit to the base station a measurement report indicating the threshold weak reference signal, as reference signal receive power (RSRP), reference signal receive quality (RSRQ) (a signal to noise ratio), or the like. Upon receiving such a measurement report from the UE, the base station could then set itself to apply TTI bundling for the UE, such as by setting a flag in the UE's context record for instance. Thus, when the base station then schedules uplink communication from the UE, the base station could responsively apply TTI bundling as described above. Further, other channel quality metrics could be considered as well.

In addition, the base station could take into account other factors as a basis to trigger TTI bundling for a UE. For instance, the base station could consider quality-of-service (QoS) attributes of one or more bearers established for the UE and could treat certain QoS levels as more heavily or lightly justifying application of TTI bundling. By way of example, if the UE has an established voice-over-IP bearer, designated by a high-level QoS attribute, the base station could more readily trigger TTI bundling for the UE, to help ensure quality voice communication. Further, the base station could consider the rate of a UE's HARQ re-transmissions and could more readily trigger TTI bundling for the UE if the UE's re-transmission rate has been threshold high. Other examples are possible as well.

As noted above, uplink communication with TTI bundling could consume more air interfaces then uplink communication without TTI bundling. Consequently, as indicated above, it could be beneficial for a base station to more strictly limit application of TTI bundling when faced with a high-load scenario. Further, in a situation where HPUEs could operate with higher maximum transmit power than traditional (non-HP) UEs, it could be useful in a high-load scenario to differentially control application of TTI bundling as between HPUEs and traditional UEs. Namely, as noted above, it could be useful in a high-load scenario to more strictly limit application of TTI bundling (or less leniently allow application of TTI bundling) for HPUEs than for traditional UEs, on grounds that HPUEs have higher maximum transmit power than traditional UEs.

To carry this out in practice, base station 12 could regularly monitor the level of load on its air interface 14. Load, for this purpose, could be defined in various ways. For example, load could be a measure of resource utilization, such as a percentage of total PRBs allocated per unit time, a percentage of control channel resources allocated per unit time, or the like. Further, where TTI bundling would be applied for uplink communication, such resource utilization could be measured with respect to uplink resources only or could be measured with respect to downlink resources as well or instead, as a proxy indication of how loaded the air interface is as a whole. And as another example, load could be a measure of quantity of served UEs or could take still other forms.

Further, the base station could establish statistics of its air interface load per time of day and could use those statistics as a proxy indication of how loaded its air interface is likely to be at any given time of day. For instance, if the base station determines based on monitoring that the air interface is heavily loaded at a particular hour of each weekday, the base station could deem that weekday hour to be a high-load time, and then upon arrival of that weekday hour, the base station could deem the air interface to be highly loaded, on grounds that it is statistically likely to be. Other mechanisms for monitoring and determining air interface load could be applied as well.

In practice, the base station could then further regularly monitor to determine whether the level of air interface load is threshold high, representing an air interface capacity constraint that could justify limiting the extent of TTI bundling. For this purpose, the base station could be provisioned with data indicating a predefined threshold load level deemed to be sufficiently high to justify limiting TTI bundling, and the base station could compare the present load level with that threshold to determine whether the load level is threshold high. And if so, the base station could then responsively set itself to differentially control application of TTI bundling as between HPUEs and traditional UEs.

To facilitate such differential control, the base station could determine which of its served UEs if any are HPUEs and which of its served UEs if any are traditional UEs. For instance, the base station could refer to each UE's context record, which could indicate the UE's maximum transmit power level, the UE's power class, the UE's make/model, and/or one or more other characteristics that expressly or inherently establish whether the UE is an HPUE or not. And the base station could accordingly impose a stricter limit on application of TTI bundling for each UE determined to be an HPUE than for each UE determined to be a traditional UE.

In line with the discussion above, the act of imposing a stricter limit on application of TTI bundling for HPUEs than for traditional UEs could take various forms.

For instance, the base station could limit application of TTI bundling to just traditional UEs, forgoing application of TTI bundling for HPUEs. Thus, when faced with triggers that would normally justify application of TTI bundling for both a traditional UE and an HPUE, the base station could apply TTI bundling for the traditional UE and forgo applying TTI bundling for the HPUE.

As another example, in a scenario where TTI bundling gets triggered for a UE when the UE has threshold poor channel quality, such as threshold low RSRP or RSRQ, the act of differentially controlling TTI bundling could involve applying a lower channel quality threshold for triggering TTI bundling for HPUEs than for traditional UEs. For this purpose, the base station could dynamically provision some or all of its served UEs with an applicable TTI-bundling channel-quality threshold, such as through RRC connection-reconfiguration signaling for instance. In one example, all of the base station's UEs might already be provisioned with such a threshold, and, to begin applying a stricter limit on TTI bundling for HPUEs than traditional UEs, the base station could re-provision each HPUE with a lower channel-quality threshold, such that their channel quality would need to be worse to justify triggering of TTI bundling. Alternatively, the base station could receive channel-quality reports from UEs and could itself apply lower quality thresholds for HPUEs than for traditional UEs as a basis to more strictly limit application of TTI bundling for HPUEs than for traditional UEs.

And as still another example, the base station could set itself to use less TTI bundling for HPUEs than for traditional UEs by using a smaller TTI bundling size for HPUEs than for traditional UEs. For instance, the base station might be set by default to apply a TTI bundling size of four for all UEs, and the base station could change to a mode in which the base station applies a TTI bundling size of two for HPUEs while still applying a TTI bundling size of four for traditional UEs. Other examples are possible as well.

In practice, once the base station has switched to a mode of differentially controlling TTI bundling as between UEs based on the UEs having different maximum transmit power, the base station could then continue to monitor its air interface load. And when the base station detects that the air interface load is no longer threshold high, or has become threshold low, the base station could then revert to treat the UEs more equally, without regard for their maximum transmit power levels.

Figure 2:
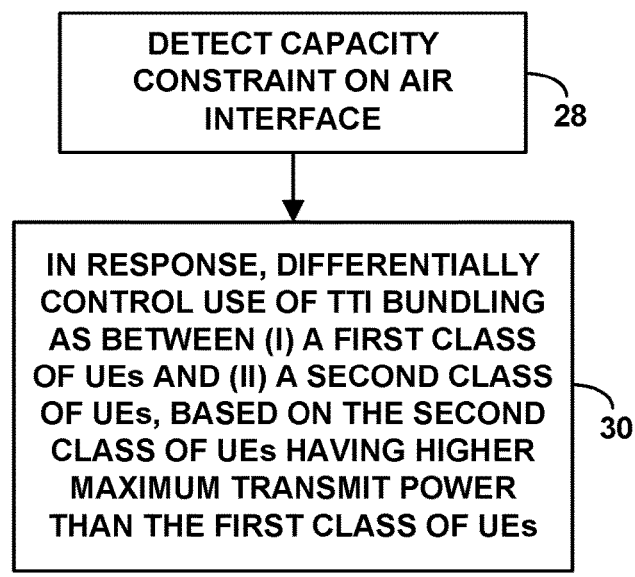
FIG. 2 is a flow chart depicting example operations in accordance with the disclosure.

FIG. 2 is next a flow chart depicting in summary various operations that can be carried out in accordance with the present disclosure, to control TTI bundling (e.g., uplink TTI bundling) in a wireless communication system. In line with the discussion above, the wireless communication system would include a base station that is configured to serve UEs over an air interface, where the UEs (which the base station can serve or is serving) include a first class of UEs and a second class of UEs, and where the maximum transmit power of the UEs of the second class is higher than the maximum transmit power of the UEs of the first class. For instance, the first class of UEs could be traditional UEs and the second class of UEs could be HPUEs, when operating in a scenario (e.g., on a particular carrier) where HPUEs have higher maximum transmit power than traditional UEs (e.g., 26 dBm versus 23 dBm).

As shown in FIG. 2, at block 28, the base station detects a capacity constraint, such as a threshold high level of load for instance, on the air interface. And at block 30, in response to detecting the capacity constraint on the air interface, the base station differentially controls use of TTI bundling as between (i) the first class of UEs and (ii) the second class of UEs, based on the second class of UEs having higher maximum transmit power than the first class of UEs. Namely, the reason for applying this differential control could be at least that second class of UEs has higher maximum transmit power than the first class of UEs. And applying the differential control could then involve operating in a mode such that the base station would apply a stricter limit on use of TTI bundling for the second class of UEs than on use of TTI bundling for the first class of UEs.

As discussed above, for example, TTI bundling for any given UE could be triggered based on the UE having air interface channel quality lower than a defined channel quality threshold, determined based on an evaluation of a reference signal from the base station for instance. And in that case, the act of differentially controlling use of TTI bundling as between the first class of UEs and the second class of UEs could involve applying a lower channel quality threshold for triggering TTI bundling for the second class of UEs than for triggering TTI bundling for the first class of UEs.

Alternatively or additionally, the act of differentially controlling use of TTI bundling as between the first class of UEs and the second class of UEs could involve allowing use of TTI bundling for the first class of UEs and preventing use of TTI bundling for the second class of UEs. And still alternatively or additionally, the act of differentially controlling use of TTI bundling as between the first class of UEs and the second class of UEs could involve using a higher TTI bundling size for UEs of the first class than for UEs of the second class, where TTI bundling size defines a number of times a given transmission is repeated before an associated acknowledgement message is provided.

Finally, FIG. 3 is a simplified block diagram of an example base station, showing some of the components that could be included in the base station to facilitate carrying out operations such as those described above. As shown, the example base station includes a wireless communication interface 32, a backhaul network interface 34, and a controller 36, all of which could be integrated together and/or communicatively linked together by a system bus, network, or other connection mechanism 38.

As shown, the wireless communication interface 32 includes an antenna structure 40 that is configured to transmit and receive on the air interface, as well as a power amplifier 42, and radio 44, cooperatively facilitating downlink and uplink communications. The backhaul network interface 34 then includes one or more network interface modules for coupling with a core network or the like. And the controller 36 includes a processing unit (e.g., one or more microprocessors) 46, non-transitory data storage (e.g. one or more volatile and/or non-volatile storage components such as magnetic, optical, or flash storage) 48, and program instructions 50 stored in the data storage and executable by the processing unit to carry out various base station operations such as those discussed above.

Exemplary embodiments have been described above. Those skilled in the art will understand, however, that changes and modifications may be made to these embodiments without departing from the true scope and spirit of the invention.

For example, although the discussion above focuses on two different classes of UEs, the principles discussed could extend to apply as well with respect to more than two different classes of UEs. For instance, given first, second, and third different classes of UEs that each have a different respective maximum transmit power level, a base station could respond to high load on the air interface by transitioning to a mode in which it differentially controls application of TTI bundling as between those three classes of UEs. In that case, the base station might then more strictly limit application of TTI bundling for the second class than for the first class and more strictly limit application of TTI bundling for the third class than for the second class. Other examples are possible as well.

What is claimed is:

1. A method for controlling Transmission Time Interval (TTI) bundling in a wireless communication system comprising a base station configured to serve user equipment devices (UEs) over an air interface, wherein each UE has a maximum transmit power for transmitting on the air interface, wherein the UEs include a first class of UEs and a second class of UEs, and wherein the maximum transmit power of the UEs of the second class is higher than the maximum transmit power of the UEs of the first class, the method comprising:

detecting by the base station a capacity constraint of the air interface; and responsive to the detecting, differentially controlling, by the base station, use of TTI bundling as between (i) the first class of UEs and (ii) the second class of UEs, based on the second class of UEs having higher maximum transmit power than the first class of UEs.

2. The method of claim 1, wherein detecting the capacity constraint on the air interface comprises detecting a threshold high level of load on the air interface.

3. The method of claim 1, wherein differentially controlling use of TTI bundling as between the first class of UEs and the second class of UEs comprises imposing a stricter limit on use of TTI bundling for the second class of UEs than on use of TTI bundling for the first class of UEs.

4. The method of claim 3, wherein TTI bundling for any given UE is triggered based on the UE having air interface channel quality lower than a defined channel quality threshold, and wherein differentially controlling use of TTI bundling as between the first class of UEs and the second class of UEs comprises:

applying a lower channel quality threshold for triggering TTI bundling for the second class of UEs than for triggering TTI bundling for the first class of UEs.

5. The method of claim 4, wherein the air interface channel quality is based on evaluation of a reference signal from the base station.

6. The method of claim 3, wherein differentially controlling use of TTI bundling as between the first class of UEs and the second class of UEs comprises:

allowing use of TTI bundling for the first class of UEs and preventing use of TTI bundling for the second class of UEs.

7. The method of claim 3, wherein TTI bundling has a TTI bundling size defining a number of times a given transmission is repeated before an associated acknowledgement message is provided, and wherein differentially controlling use of TTI bundling as between the first class of UEs and the second class of UEs comprises:

using a higher TTI bundling size for UEs of the first class than for UEs of the second class.

8. The method of claim 3, further comprising distinguishing by the base station between the first class of UEs and the second class of UEs based on profile records maintained by the base station.

9. The method of claim 1, wherein the TTI bundling is uplink TTI bundling.

10. The method of claim 1, wherein the maximum transmit power of the first class of UEs is 23 dBm, and wherein the maximum transmit power of the second class of UEs is 26 dBm.

11. A base station configured to control TTI bundling in a wireless communication system, wherein the base station is configured to serve user equipment devices (UEs) over an air interface, wherein each UE has a maximum transmit power for transmitting on the air interface, wherein the UEs include a first class of UEs and a second class of UEs, and wherein the maximum transmit power of the UEs of the second class is higher than the maximum transmit power of the UEs of the first class, the base station comprising:

an antenna structure configured to transmit and receive on the air interface; and a controller configured to detect a capacity constraint on the air interface and, in response to the detecting, to differentially control use of TTI bundling as between (i) the first class of UEs and (ii) the second class of UEs, based on the second class of UEs having higher maximum transmit power than the first class of UEs.

12. The base station of claim 11, wherein detecting the capacity constraint on the air interface comprises detecting a threshold high level of load on the air interface.

13. The base station of claim 11, wherein differentially controlling use of TTI bundling as between the first class of UEs and the second class of UEs comprises imposing a stricter limit on use of TTI bundling for the second class of UEs than on use of TTI bundling for the first class of UEs.

14. The base station of claim 13, wherein TTI bundling for any given UE is triggered based on the UE having air interface channel quality lower than a defined channel quality threshold, and wherein differentially controlling use of TTI bundling as between the first class of UEs and the second class of UEs comprises:

applying a lower channel quality threshold for triggering TTI bundling for the second class of UEs than for triggering TTI bundling for the first class of UEs.

15. The base station of claim 14, wherein the air interface channel quality is based on evaluation of a reference signal from the base station.

16. The base station of claim 13, wherein differentially controlling use of TTI bundling as between the first class of UEs and the second class of UEs comprises:

allowing use of TTI bundling for the first class of UEs and preventing use of TTI bundling for the second class of UEs.

17. The base station of claim 13, wherein TTI bundling has a TTI bundling factor defining a number of times a given transmission is repeated before an associated acknowledgement message is provided, and wherein differentially controlling use of TTI bundling as between the first class of UEs and the second class of UEs comprises:

using a higher TTI bundling factor for UEs of the first class than for UEs of the second class.

18. The base station of claim 13, wherein the controller is configured to distinguish between the first class of UEs and the second class of UEs based on profile records maintained by the base station.

19. The base station of claim 11, wherein the TTI bundling is uplink TTI bundling.

20. The base station of claim 11, wherein the maximum transmit power of the first class of UEs is 23 dBm, and wherein the maximum transmit power of the second class of UEs is 26 dBm.

* * * * *